June 28, 1955   J. W. GRAY   2,711,722
ANIMAL ACTUATED LIVESTOCK MEDICATOR
Filed Jan. 13, 1954
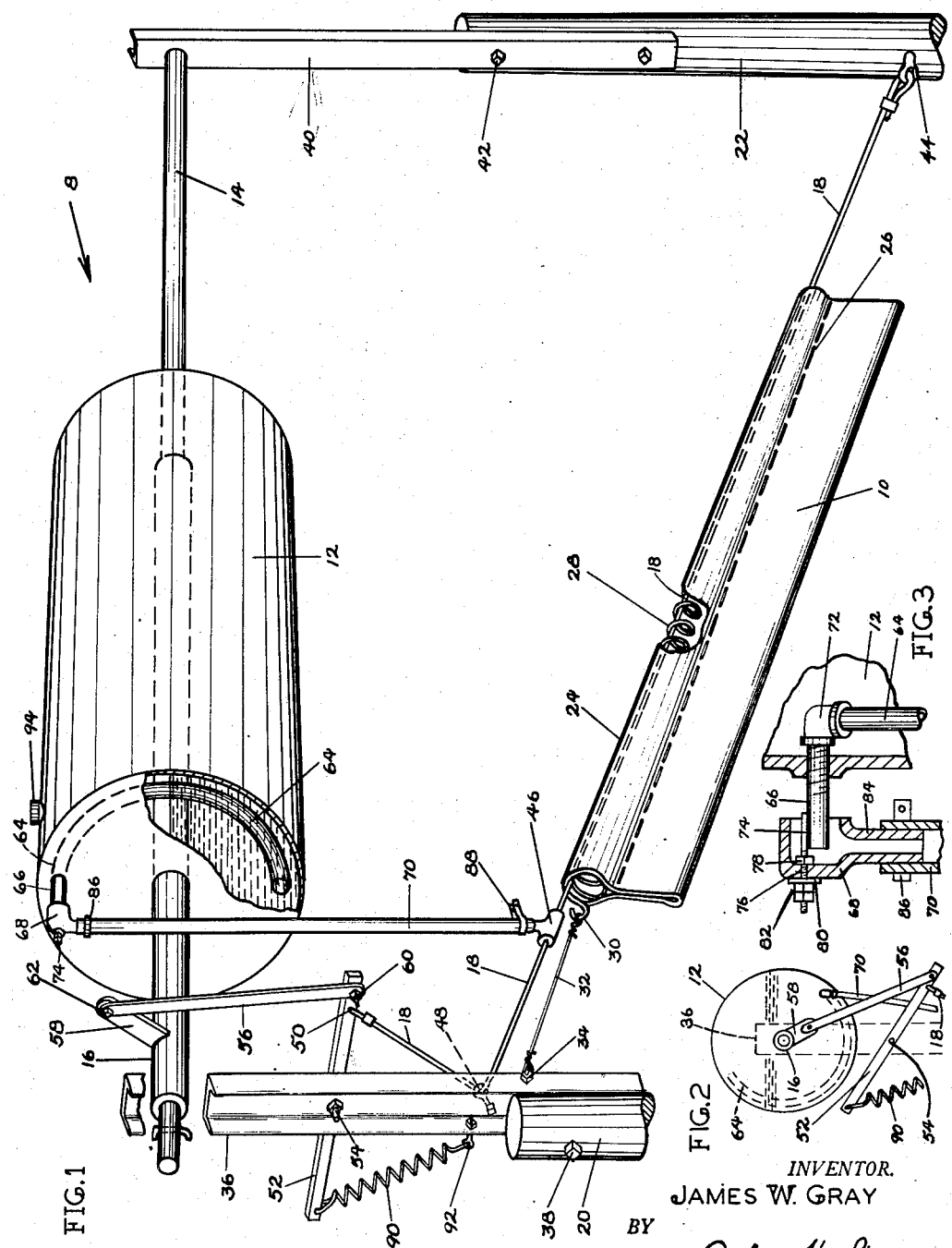
INVENTOR.
JAMES W. GRAY
BY
Arthur H. Sturges
ATTORNEY United States Patent Office 2,711,722
Patented June 28, 1955

2,711,722

ANIMAL ACTUATED LIVESTOCK MEDICATOR

James W. Gray, Merriman, Nebr.

Application January 13, 1954, Serial No. 403,790

2 Claims. (Cl. 119—157)

This invention relates to devices for applying medicine to the backs and sides of animals, such as generally referred to as hog oilers, and in particular an apron of fabric material, such as canvas, suspended by a cable between posts with the cable adapted to actuate feeding means whereby predetermined quantities of a liquid in a drum rotatably mounted in the upper ends of the posts are supplied to the apron at such times as animals are rubbing against the apron, and wherein, as an animal leaves the apron the supply of the liquid is terminated.

The purpose of this invention is to provide means whereby a medicament is applied to the backs and sides of animals with a wiping action whereby substantially the entire back and side surfaces of the animal will be covered with the medicament.

Various types of perforated tubes, pipes, chains and cables have been used for applying oil and other medicaments to the backs and sides of animals, however, the stiff tubes and hard chains irritate the skin of the animals and for this reason applicators of this type are not used regularly. To maintain animals in clean healthy condition continuously it is essential that parasites on the body of the animal be worked on continuously and for this reason applicators for this purpose should be as inviting as possible.

With this thought in mind this invention contemplates an applicator for applying medicaments to backs and sides of animals which presents a comparatively soft contacting surface to the animal and which applies the medicament to the animal with a wiping action.

The object of this invention is, therefore, to provide an improved device for applying medicine to backs and sides of live stock on farms in which the medicine is applied with a wiping action.

Another object of the invention is to provide an applicator spreading medicine over the backs and sides of animals with a wiping action in which the medicine is only supplied to the wiping element as an animal is contacting the element.

Another important object of the invention is to provide a device for applying a medicament to the backs and sides of animals with a wiping action in which the medicament is fed to the wiping element in measured quantities.

It is yet another object of the invention to provide a device for applying a medicament to the backs and sides of animals with a wiping action in which the device is adapted to be used by animals of different sizes.

A further object of the invention is to provide a medicament applicator for live stock in which the applying element is in the form of an apron or swab so that it is more attractive to cattle than steel tubes or chains.

A still further object of the invention is to provide an improved device for applying medicine to live stock wherein measured quantities of the medicine are applied with a wiping action in which the device is of a simple and economical construction.

With these and other objects and advantages in view the invention embodies spaced posts having a shaft mounted in the upper ends with a tube rotatably mounted on the shaft, a drum having a measuring element therein carried by the tube, a cable having a coil in the intermediate part thereof suspended in an inclined position between the posts, a fabric apron extended around the coil and depending therefrom, means for rotating the drum as the cable is pushed to one side by an animal rubbing against the apron, and resilient means for returning the parts to the inoperative position of the device as an animal leaves the apron.

Other features and advantages of the invention will appear from the following description taken in connection with the drawings, wherein:

Figure 1 is a front elevational view, in perspective, showing the drum and apron suspended between the posts with parts of the drum, posts and apron broken away.

Figure 2 is an end elevational view with the parts shown on a somewhat reduced scale and with the lower part of the device broken away illustrating the drum actuating levers and showing the drum rotated through an angle of approximately 78 degrees.

Figure 3 is an enlarged view of a detail showing a section through the connection between the measuring tube in the drum which feeds a small quantity of antiseptic to the feed tube and at the same time stirs or agitates the contents of the drum by rotation. The tube then supplies the apron or fabric for the animal.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the accompanying drawings and in the following specification, the same reference characters are used to designate the same parts and elements throughout and in which the numeral 8 refers to the invention in its entirety, numeral 10 indicating a medicament applying apron, numeral 12 a drum providing a reservoir, numeral 14 a shaft extended between the upper ends of the posts, numeral 16 a tube rotatably mounted on the shaft and on which the drum is mounted, and numeral 18 a cable extended between the posts, which are indicated by the numerals 20 and 22, and upon which the apron 10 is suspended.

The apron is formed of a length of tubular fabric, such as canvas and the portion 10 extends from a tunnel portion 24 formed by stitches 26 and positioned around a coil 28 through which the cable 18 extends. The last coil at the upper end of the coil 28 is formed to provide a hook 30 to which one end of a cable 32 is attached, and the opposite end of the cable is attached to an eye 34 on one side of a channel bar 36 extended upwardly from the tubular post 20. By this means the apron is retained in position upon the cable 18.

The channel bar 36 is secured to the upper end of the post 20 with bolts 38 and a similar channel bar 40 is secured to the upper end of the post 22 with bolts 42.

The post 22 is provided with an eye 44 to which the lower end of the cable 18 is attached and the upper part of the cable, which extends through a pipe fitting, such as a T 46, also extends through an eye 48 on the face of the channel bar 36, as shown in dotted lines in Figure 1. From the eye 48 the cable 18 extends to an eye 50 on one end of a horizontally disposed lever 52, which is pivotally mounted by a bolt 54, on the channel bar 36, and which is connected by a link 56 to an arm 58 extended from the tube 16. The link is connected to the lever 52 with a bolt 60 at one end and to the arm 58 at the opposite end with a bolt 62, and with the parts connected in this manner each time an animal pushes against the apron 10 the cable 18 draws the end of the lever 52 downwardly whereby the link 56 moves the arm 58 to rotate the tube 16 and drum 12.

Upon rotation of the drum from the position shown in Figure 1 to that shown in Figure 2 a measured amount of liquid, which is normally positioned in a substantially semi-circular tube 64 in the end of the drum, passes through a nipple 66 into a fitting 68, and from the fitting 68 through a tube or hose 70 to the fitting 46 through which the cable 18 passes. From the fitting 46 the liquid passes along the cable to the tunnel portion of the apron and continues to travel until the apron is substantially saturated thereby.

The tube 64 is threaded into a fitting 72 in the opposite end of which the nipple 66 is threaded, and, as shown in Figure 3 a threaded rod 74, which is secured to the upper side of the nipple 66 by welding, extends through an opening 76 in the end wall of the fitting 68. The rod is secured in the fitting with a lock nut 78 inside of the fitting and with a washer 80 and nuts 82 on the outside. The fitting 68 is provided with a neck 84 to which the hose 70 is secured by a clamp 86, and the lower end of the hose is secured to a branch connection of the fitting 46 with a similar clamp, as indicated by the numeral 88.

With the parts assembled in this manner a medicament applicator is provided which supplies small amounts of medicine to an apron or wiping element each time an animal rubs against the apron, and the applicator is automatic, as each time the drum is rotated to supply the medicament a spring 90, one end of which is attached to an end of the lever 52 and the other to an eye 92 on the channel bar 36, returns the lever and drum to the positions shown in Figure 1.

The supply of medicament in the drum may be replenished as it is used through a filling plug 94 in the upper side of the drum.

The elevation of the device may readily be adjusted by raising and lowering the channel bars on the posts.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention, that which is claimed to be new and desired to be procured by Letters Patent is:

1. In a medicament applicator, the combination which comprises spaced posts having supporting elements adjustably mounted on the upper ends, a shaft extended between the upper ends of the supporting elements, a cable extended between the posts and suspended in an inclined position, a coil spring positioned around said cable, a fabric apron having a tunnel in the upper edge depending from the cable and positioned with the coil in said tunnel, a drum rotatably mounted on the shaft extended between the upper ends of the supporting elements of the posts, measuring means in one end of the drum, a hose extended from the measuring means of the drum to the cable from which the apron extends, and means for actuating the drum for feeding medicament from the measuring means to the cable upon engagement of the apron by an animal.

2. In a medicament applicator for live stock, the combination which comprises spaced posts, a horizontally disposed shaft mounted in the upper ends of the posts, a tube rotatably mounted on said shaft, a drum mounted on said tube, a semi-circular tube positioned in one end of the drum, a cable suspended between the posts and positioned in an inclined position, an apron depending from said cable, a hose extended from the semi-circular tube in the end of the drum to said cable for conveying medicament from the drum to the apron, means rotating the drum to feed measured amounts of medicament to the apron as the apron is pushed laterally, and resilient means for returning the drum and rotating means thereof to the inoperative position.

References Cited in the file of this patent

UNITED STATES PATENTS

| | | |
|---|---|---|
| 1,284,700 | Johnson | Nov. 12, 1918 |
| 1,382,066 | Curran | June 21, 1921 |
| 1,546,898 | Hinken | July 21, 1925 |
| 1,999,123 | Clark et al. | Apr. 23, 1935 |
| 2,632,063 | Peterson | Mar. 17, 1953 |
| 2,669,968 | Rasmussen | Feb. 23, 1954 |